United States Patent [19]

Chung

[11] 4,164,251
[45] Aug. 14, 1979

[54] POLYURETHANE TIRE AND WHEEL ASSEMBLY

[75] Inventor: Daniel A. Chung, North Canton, Ohio

[73] Assignee: The Goodyear Tire & Rubber Company, Akron, Ohio

[21] Appl. No.: 851,246

[22] Filed: Nov. 14, 1977

Related U.S. Application Data

[63] Continuation of Ser. No. 570,155, Apr. 21, 1975, abandoned.

[51] Int. Cl.² .................. B60C 1/00; C08G 18/76; C08K 5/36
[52] U.S. Cl. ................................. 152/323; 301/63 PW; 528/64
[58] Field of Search ............... 152/323; 260/75 NH, 260/75 NC; 301/63 PW

[56] References Cited

U.S. PATENT DOCUMENTS

| | | | |
|---|---|---|---|
| 3,168,773 | 2/1965 | Frye | 152/323 X |
| 3,926,919 | 12/1975 | Finelli | 260/75 NH |
| 3,952,786 | 4/1976 | Kreling et al. | 152/323 |
| 4,071,279 | 1/1978 | Chung | 152/323 X |
| 4,095,637 | 6/1978 | Krishman | 152/323 |
| 4,095,846 | 6/1978 | Hgins | 152/323 X |

OTHER PUBLICATIONS

Wright & Cumming, *Solid Polyurethane Elastomers;* (1969, pp. 215-224).

*Primary Examiner*—Sandra M. Person
*Attorney, Agent, or Firm*—H. C. Young, Jr.

[57] ABSTRACT

A solid industrial polyurethane tire and a wheel assembly comprised of such a tire adhered to a rigid central core, or hub. The hub is generally adaptable to fit onto an axle of an industrial vehicle. Said polyurethane tire is prepared by reacting 2,2'-dithiodianiline with a prepolymer of selected diisocyanates and selected polymeric polyester and polyether polyols and their mixtures.

1 Claim, 2 Drawing Figures

POLYURETHANE TIRE AND WHEEL ASSEMBLY

This is a continuation of application Ser. No. 570,155 filed Apr. 21, 1975, and now abandoned.

This invention relates to solid industrial wheels, or tires. The invention particularly relates to resilient polyurethane solid tires suitable for use on vehicles adapted for transportation of goods within industrial manufacturing plant facilities.

Polyurethane wheels have long been used for industrial vehicles, such as fork lift trucks and other industrial material and personnel carriers within industrial plants. Generally such vehicles are of the slow-moving type, although they have typically been required to many times carry heavy loads compared to their tire size.

However, such polyurethane solid industrial wheels, or tires, could be deficient in that the polyurethanes used themselves had a characteristic low slit tear strength. Such a quality defect in the polyurethane can result in a nick propagation across the tire evidenced by a growing slit and eventual malfunction of the wheel or tire itself.

Furthermore, such wheels were typically prepared from polyester polyols rather than polyether polyols, primarily because the polyurethanes prepared from polyether polyols generally exhibited poorer physical properties needed for the wheels.

Therefore, it is an object of this invention to provide a solid polyurethane industrial wheel, or tire, suitable for use on a relatively slow traveling interplant transportation vehicle having an enhanced dynamic performance.

In accordance with this invention, a substantially solid industrial wheel having a polyurethane ground contacting portion adaptable for axial mounting on a wheel-accepting support member of an industrial vehicle is provided where said polyurethane is prepared by the method which comprises reacting 2,2'-dithiodianiline with a prepolymer, or reaction product, of (A) 3,3'-dimethyldiphenylmethane-4,4'-diisocyanate and (B) at least one polymeric polyol having an average molecular weight in the range of about 800 to about 3200, preferably about 800 to about 2500, selected from polyether polyols and polyester polyols having a hydroxyl functionality of about 2 to about 2.2, preferably about 2, and from hydroxyl terminated, unsaturated polymeric polyols of diene hydrocarbons having a hydroxyl functionality in the range of about 2 to about 2.6.

The cured polyurethane is preferably characterized by having a slit tear strength according to ASTM D-1938 in the range of about 15 to about 30, a compression set of about 25 to about 35 percent, a value as determined by ASTM D-395 (Method B) and a Goodrich flex life of at least about 15 minutes according to ASTM D-623 modified by using a 437 psi load. The cured polyurethane is further typically characterized by having a 300 percent modulus in the range of about 1500 to about 2500 as measured on an Instron tester with a crosshead speed of about 20 inches per minute.

In the practice of this invention, it is generally preferred that the industrial tire is prepared by pouring or injecting into a concave mold a mixture of 2,2'-dithiodianiline and the reaction product of (A) 3,3'-dimethyldiphenylmethane-4,4'-diisocyanate and (B) a polymeric polyol comprised of about 50 to about 100 weight percent polyester polyol and, correspondingly, about 50 to about zero weight percent of a polyether polyol.

Representative of various polyester polyols are caprolactone polyesters as the product of a caprolactone, such as ε-caprolactone with diethylene glycol, or a hydrocarbon diol containing 4 to 7 carbon atoms such as 1,4-butane diol, 1,5-pentane diol, and 1,6-hexane diol, preferably diethylene glycol; the condensation of low molecular weight saturated hydrocarbon diols containing 2 to 10 carbon atoms with an organic polycarboxylic acid selected from succinic acid, adipic acid and azelaic acid, as well as anhydrides of such acids; polyethylene adipate and polyethylene propylene adipate.

Representative of various polyols which are polyester and polyether in nature are those such as polydiethylene adipate.

Representative of various polyether polyols are of the type prepared by (1) polymerizing or copolymerizing alkylene oxides containing 1 to 4 carbon atoms such as ethylene oxide, propylene oxide and butylene oxide, (2) polymerizing or copolymerizing low molecular weight glycols such as ethylene glycol, 1,3-propane diol and 1,4-butane diol, (3) or by the reaction of one or more of said alkylene oxides with said glycols and, optionally, with a small amount of a triol such as trimethylol propane.

In the practice of this invention, a tire assembly can conveniently be provided which is composed of a polyurethane ground contacting tire portion adhered to a center core, which might otherwise be called a rim or hub, said core being adapted to fit the wheel onto an axle of an industrial vehicle.

In the general practice of this invention, the industrial tire assembly can conveniently be prepared by charging, such as by pouring or injecting, a fluid mixture of the polyurethane precursors to a mold having a rigid center core portion positioned therein, curing the reaction mixture to form the resilient polyurethane tire portion and to adhere said tire to the core member, followed by removing the tire assembly from the mold apparatus.

Generally the polyurethane reaction mixture can generally be cured at a temperature in the range of about 80° C. to about 150° C. for a period of about 1 hour to about 24 hours. The actual cure period and temperature can be varied somewhat depending on both the chosen reactants and upon the size and configuration of the solid tire itself. The utility of the invention is especially enhanced by the ability to produce a solid industrial wheel from a fluid mixture, without the aid of a solvent, resulting in a tire itself having enhanced slit tear resistance, as especially compared to a glycol-cured polyurethane solid tire. Indeed, distinct process advantages have been observed as compared to the glycol-cured recipes, which include significantly reduced shrinkage, cracking and void-content of the solid tire. Further, the polyurethane was observed to gain strength faster during the curing step and allowed earlier demolding. Physical properties were rapidly attained without the typical required aging of the glycol-cured recipes.

For further understanding of this invention, reference may be had to the accompanying drawing in which.

Figure 1:
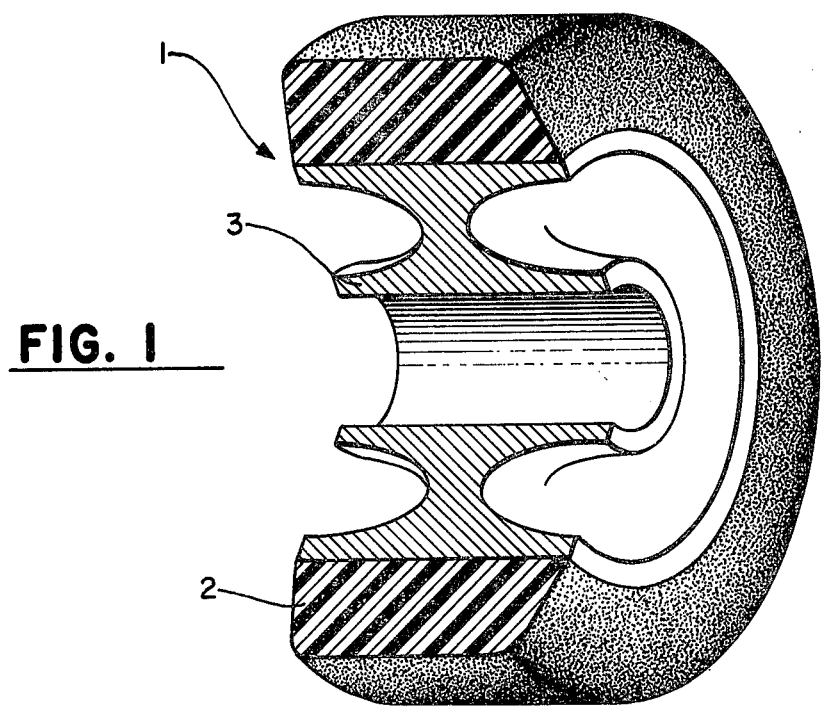
FIG. 1 is a perspective view having a cut-away portion illustrating a wheel consisting of a solid polyurethane tire fitted over a metal hub or rim.
Figure 2:
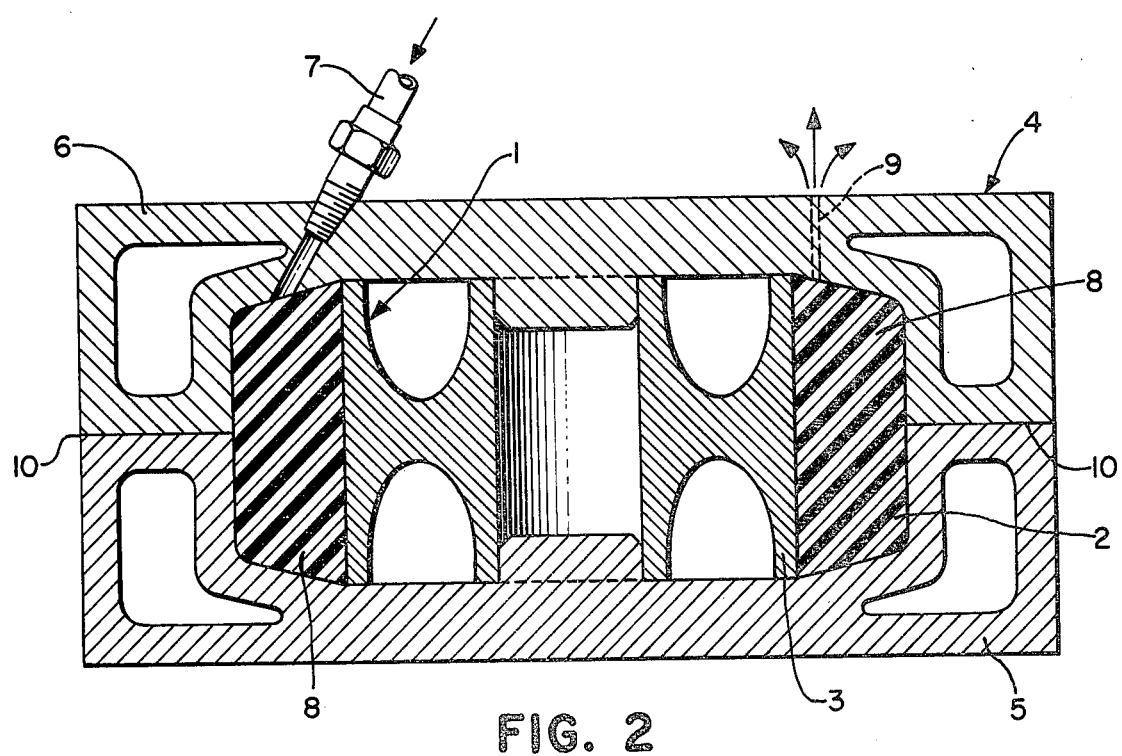
FIG. 2 is a vertical cross sectional view of such a wheel contained in a mold suitable for its preparation.

Referring to the drawing, the wheel (1) having the especially beneficial and unique solid polyurethane tire (2) adhered to the central core (3), which may also be termed a hub or rim, is shown. Such a wheel can conveniently be step-wise prepared by fitting a hub (3) into a suitable mold (4) and particularly positioned in its bottom portion (5). The top portion (6) of the mold is then fitted over the hub (3) and the required polyurethane liquid precursor reaction mixture is injected through an inlet nozzle (7) into the mold cavity surrounding the positioned hub (3). As the polyurethane reaction mixture (8) fills the mold cavity around the hub (3), air is allowed to exit or exhaust through a vent (9). The mold assembly (4) is placed in a hot air oven where the polyurethane reaction mixture (8) is allowed to cure for several hours at about 100° C. The mold assembly (4) is then removed from the oven, broken apart at its seam line (10) and the resulting wheel (1) removed and conveniently installed on the wheel of an industrial vehicle, such as a fork lift truck.

The practice of this invention is further illustrated by reference to the following examples which are intended to be representative rather than restrictive of the scope of the invention. Unless otherwise indicated, all parts and percentages are by weight.

EXAMPLE I

A concave mold was used to prepare a solid wheel having a polyurethane tire portion with an outside diameter of about 10 inches, an inside diameter of about 7 inches and a thickness of about 1½ inches. The tire had a center core or hub in the middle of a baseband in its center portion.

For the preparation of the wheel, the mold was preheated in an oven at about 100° C. for about 1 hour. The concave mold had a baseband with a diameter of about 7 inches positioned in its center portion. The baseband had been painted with a suitable adhesive. To the heated mold was charged a mixture of a prepolymer and 2,2'-dithiodianiline curative, which themselves had been preheated immediately prior to mixing. The mold containing the solid-free polyurethane reaction mixture and the inserted baseband was placed in a hot air oven and cured at about 105° C. for about 16 hours. The mold was broken apart and the wheel assembly removed therefrom after the curing period. The wheel assembly itself had a resilient polyurethane ground contacting outer portion, somewhat in the shape of a doughnut, with an adhered center core of the metal baseband, or hub, which could be adapted for attaching to a wheel of an industrial vehicle.

Test samples of the prepared reaction mixture were also cast as a film or coating after the tire mold had been filled. Such samples were then tested for physical properties.

The recipe of the reaction mixture make up, the results of the tests made upon the cast polyurethane samples as well as resiliometer tests of the wheel assembly, or tire, are more clearly shown in the following Table 1.

TABLE 1

| Compound | Experiment A |
| --- | --- |
| Polytetramethylene adipate (mv 2000) | 100 parts by wt |
| 3,3'-dimethyldiphenylmethane-4,4'-diisocyanate | 27.8 parts by wt |
| 2,2'-dithiodianiline | 10.2 parts by wt |
| Physical Tests | |
| Modulus (25° C.) 100% | 850 psi |
| Modulus (25° C.) 300% | 1800 psi |

TABLE 1-continued

| Compound | Experiment A |
| --- | --- |
| Modulus (25° C.) 500% | 3800 psi |
| Ultimate Tensile | 5400 psi |
| Ultimate Elongation | 580 psi |
| aaSlit tear (lbs) ASTM D-1938 | 20 |
| Crescent tear (ASTM D-624, Die C)(lb/in) | 490 |
| Goodrich flex life (Modified)* | |
| Time (min) | |
| 7 days at 25° C. | 15+ |
| 14 days at 25° C. | 15+ |
| Shore A/Shore D harndess | 91/41 |
| REsiliometer Tests (hrs)** | 49 |

*The Goodrich flex life test, according to ASTM D-623 was modified by utilizing a 437 psi load, starting the materials at a temperature of 38° C. and utilizing a stroke of 0.15 inch.
**For the resiliometer tests the tire, or wheel assembly, was mounted on a resiliometer and run at 7.5 mps. Initially, a load of 190 pounds for 2 hours was applied then 375 pounds for 4 hours were put on the tire as a load. The test was then continued at load increment increases of 95 pounds after every 8 hours of running until 1220 pounds had been reached, unless a blow out or failure had earlier occurred.

In the practice of this invention, although various amounts of polyurethane precursors can be used to form the tire or wheel assembly of this invention, in order to practically provide a satisfactory polyurethane portion of satisfactory physical properties, it is desired, and preferably required, that the ratio of isocyanate groups to polyol hydroxyl groups is in the range of about 1.7/1 to about 2.3/1, and the ratio of amino groups to excess isocyanate groups over said hydroxyl groups is in the range of about 0.8/1 to about 1.1/1. In the further practice of this invention, although 3,3'-dimethyldiphenylmethane-4,4'-diisocyanate is the preferred prepolymer-forming diisocyanate, 1,5-naphthylene diisocyanate or 3,3'-bitolylene-4,4'-diisocyanate can generally satisfactorily be substituted therefor, generaly somewhat reduced physical properties result in the cured polyurethane tire itself.

While certain representative embodiments and details have been shown for the purpose of illustrating the invention, it will be apparent to those skilled in this art that various modifications and changes may be made therein without departing from the spirit or scope.

What is claimed is:

1. In an industrial tire/wheel assembly comprised of a solid, resilient polyurethane ground contacting tire molded and adhered to a centered rigid core adapted to fit to an axle of an industrial vehicle the combination of improvements wherein (i) said polyurethane is characterized by having a slit tear strength according to ASTM D-1938 in the range of about 15 to abut 30 pounds, a compression set in the range of 25 to 35 percent according to ASTM D-395(B), a Goodrich flex life of at least about 15 minutes according to ASTM D-623 modified by using a 437 psi load, a starting temperature of about 38° C. and a stroke of 0.15 inch, and a 300 percent modulus in the range of about 1500 to about 2000; and (ii) said polyurethane is prepared by the method which comprises reacting as a fluid mixture in a mold cavity in contact with said rigid core at a temperature in the range of about 80° C. to about 150° C., 2,2'-dithiodianiline with a prepolymer, or reaction product of (A) 3,3'-dimethyldiphenylmethane-4,4'-diisocyanate, and (B) at least one polymeric polyol having an average molecular weight in the range of about 800 to about 3200 comprised of about 50 to about 100 weight percent polyester polyol and, correspondingly, about 50 to about zero weight percent polyether polyol, said polyols having a hydroxyl functionality of about 2, where said polyester polymeric polyols are selected from at least one of (1) the product of ε-caprolactone with diethylene glycol, (2) the condensation of low molecular weight saturated hydrocarbon diols containing 2 to 10 carbon atoms with an organic polycarboxylic acid selected from succinic acid, adipic acid and azelaic acid, and (3) polyethylene adipate and where said polyether polymeric polyols are selected from the type prepared by (1) polymerizing or copolymerizing alkylene oxides selected from ethylene oxide, propylene oxide and butylene oxide, (2) polymerizing or copolymerizing low molecular weight glycols selected from ethylene glycol, 1,3-propane diol and 1,4-butane diol, or (3) by the reaction of one or more of said alkylene oxides with said glycols and, optionally, with a small amount of trimethylol propane; where the ratio of isocyanate groups to polyol hydroxyl groups is in the range of about 1.7/1 to about 2.3/1 and the ratio of amino groups to excess isocyanate groups over hydroxyl groups is in the range of about 0.8/1 to about 1.1/1.

* * * * *